(12) United States Patent
Ahn

(10) Patent No.: US 10,562,466 B2
(45) Date of Patent: Feb. 18, 2020

(54) SIDE IMAGING DEVICE FOR VEHICLE

(71) Applicant: HYUNDAI MOBIS CO., LTD., Seoul (KR)

(72) Inventor: Sung Joon Ahn, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/030,646

(22) Filed: Jul. 9, 2018

(65) Prior Publication Data

US 2019/0009735 A1 Jan. 10, 2019

(30) Foreign Application Priority Data

Jul. 10, 2017 (KR) .......................... 10-2017-0086984

(51) Int. Cl.
B60R 11/04 (2006.01)
H04N 5/225 (2006.01)
H04N 5/247 (2006.01)
B60R 11/00 (2006.01)

(52) U.S. Cl.
CPC ........... *B60R 11/04* (2013.01); *H04N 5/2252* (2013.01); *H04N 5/247* (2013.01); *B60R 2011/0043* (2013.01)

(58) Field of Classification Search
CPC ....... B60R 11/04; H04N 5/2252; H04N 5/247
See application file for complete search history.

(56) References Cited

U.S. PATENT DOCUMENTS

2016/0243988 A1\* 8/2016 Peterson ................. B60R 1/072
2017/0341596 A1\* 11/2017 Thompson .............. B60R 11/04

FOREIGN PATENT DOCUMENTS

KR 10-2015-0129354 A 11/2015

\* cited by examiner

*Primary Examiner* — Nicholas G Giles
(74) *Attorney, Agent, or Firm* — Knobbe Martens Olson & Bear LLP

(57) ABSTRACT

A side imaging device for a vehicle may include: a camera body movably installed at both sides of a vehicle body; a first camera unit installed in the camera body, and configured to film the rear side of the vehicle body; a second camera unit installed in the camera body, and configured to film an area around a side surface of the vehicle body; and a driving unit configured to move the camera body to protrude from the vehicle body.

11 Claims, 24 Drawing Sheets

SIDE IMAGING DEVICE FOR VEHICLE

CROSS-REFERENCES TO RELATED APPLICATIONS

The present application claims priority to Korean application number 10-2017-0086984, filed on Jul. 10, 2017, which is incorporated by reference in its entirety.

BACKGROUND OF THE INVENTION

The present invention relates to a side imaging device for a vehicle, and more particularly, to a side imaging device for a vehicle, which can reduce frictional resistance of the air when the vehicle is driven, and move a camera unit out of or into the vehicle body.

In general, a vehicle has side mirrors installed at both sides thereof. The side mirrors are installed so as to protrude from both sides of the vehicle body. Each of the side mirrors is manually folded or folded by a driving unit. A driver determines the rear situation of the vehicle based on a rear view obtained through the side mirror. The side mirror is manufactured to such a size that the rear situation of the vehicle can be sufficiently reflected in the side mirror.

However, since the conventional side mirror is manufactured to a predetermined size or more, air resistance may be increased by the side mirror when the vehicle is driven. Furthermore, since the side mirror is installed at either side of the vehicle so as to protrude at all times, the possibility that the side mirror will be damaged is increased while the sense of unity with the vehicle body is reduced. Therefore, there is a demand for a device capable of solving the problem.

The related art is disclosed in Korean Patent Publication No. 2015-0129354 published on Nov. 20, 2015 and entitled "Apparatus for reducing air resistance and noise of vehicle".

SUMMARY OF THE INVENTION

Embodiments of the present invention are directed to a side imaging device for a vehicle, which can reduce frictional resistance of the air when the vehicle is driven, and move a camera unit out of or into the vehicle body.

In one embodiment, a side imaging device for a vehicle may include: a camera body movably installed at both sides of a vehicle body; a first camera unit installed in the camera body, and configured to film the rear side of the vehicle body; a second camera unit installed in the camera body, and configured to film an area around a side surface of the vehicle body; and a driving unit configured to move the camera body to protrude from the vehicle body.

The driving unit may include: a first driving unit installed in the vehicle body or the camera body so as to move the camera body out of or into the vehicle body; and a second driving unit installed in the camera body so as to move the second camera unit in the camera body.

The first driving unit may rotate the camera body to protrude from the vehicle body, and the second driving unit may rotate the second camera unit to the outside of the camera body.

The first driving unit may linearly move the camera body to protrude from the vehicle body, and the second driving unit may rotate the second camera unit to the outside of the camera body.

The first driving unit may rotate the camera body to protrude from the vehicle body, and the second driving unit may linearly move the second camera unit to the outside of the camera body.

The first driving unit may linearly move the camera body to protrude from the vehicle body, and the second driving unit may linearly move the second camera unit to the outside of the camera body.

The first driving unit may rotate the camera body in the top-to-bottom direction of the vehicle body such that the camera body protrudes from the vehicle body.

The first driving unit may rotate the camera body in the front-to-rear direction of the vehicle body such that the camera body protrudes from the vehicle body.

The vehicle body may have a housing groove formed therein, such that the camera body is buried in the vehicle body.

The side imaging device may further include: a moving cover installed in the vehicle body so as to close the housing groove when the camera body is moved out of the housing groove; and a cover driving unit installed in the vehicle body and configured to drive the moving cover to close the housing groove.

The camera body may have an extension cover extended from the camera body, the extension cover serving to close the housing groove when the camera body is moved out of the housing groove.

The side imaging device may further include a mirror arranged on the camera body so as to reflect the rear side of the vehicle body.

DESCRIPTION OF SPECIFIC EMBODIMENTS

Hereafter, a side imaging device for a vehicle in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

First, a side imaging device for a vehicle in accordance with a first embodiment of the present invention will be described.

Figure 1:
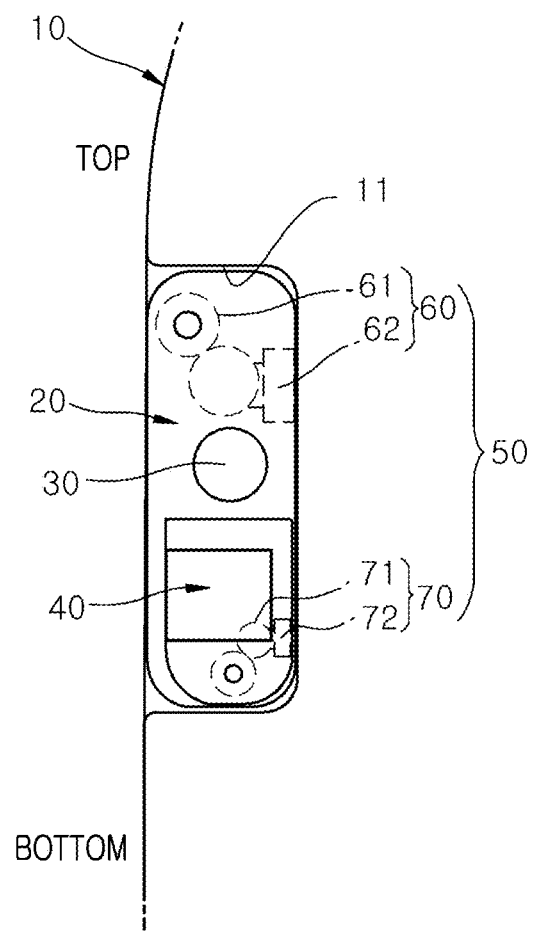
FIG. 1 illustrates a side imaging device for a vehicle in accordance with a first embodiment of the present invention.
Figure 2:
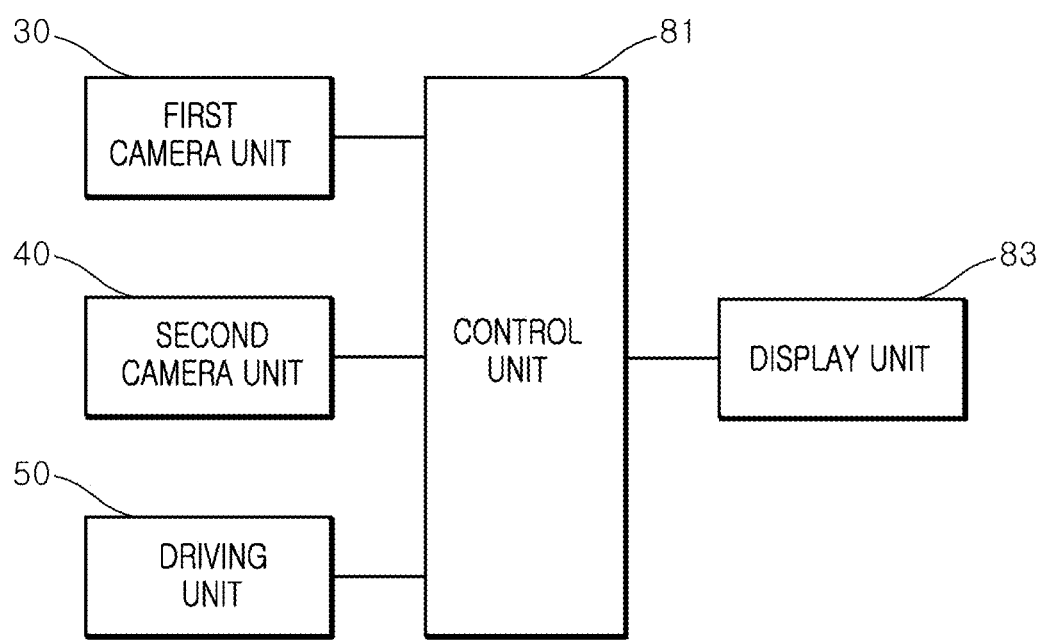
FIG. 2 is a block diagram illustrating the side imaging device for a vehicle in accordance with the first embodiment of the present invention.
Figure 3:
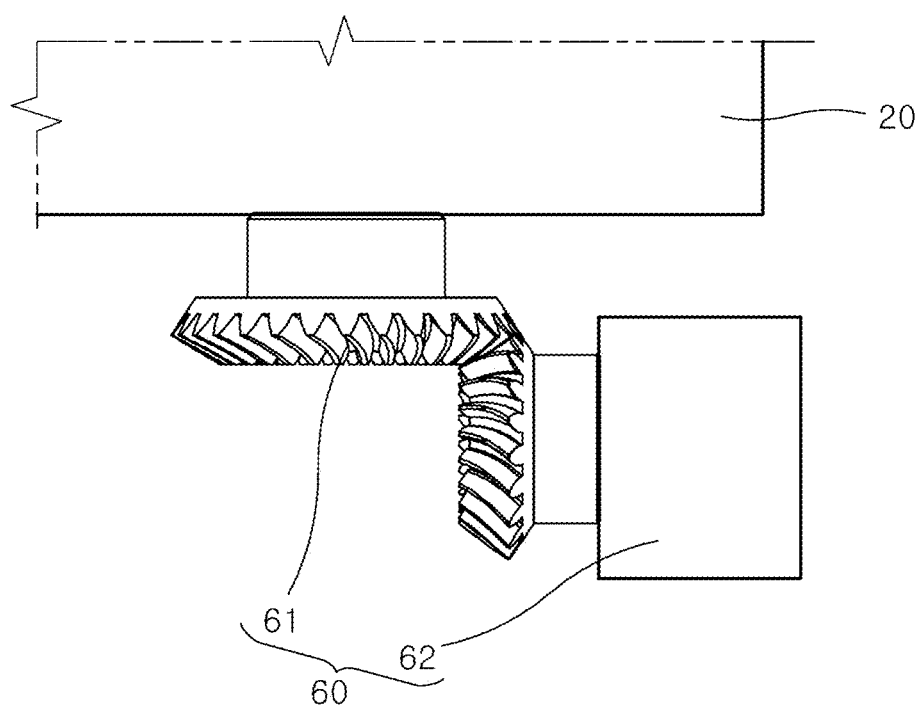
FIG. 3 illustrates a first driving unit of the side imaging device for a vehicle in accordance with the first embodiment of the present invention.
Figure 4:
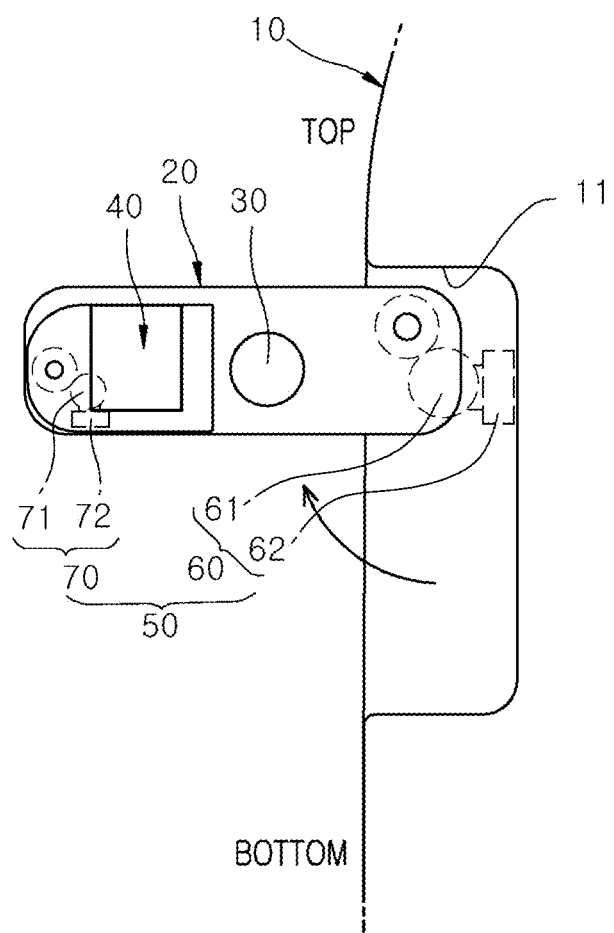
FIG. 4 illustrates that a first camera unit is rotated in a housing groove in the side imaging device for a vehicle in accordance with the first embodiment of the present invention.
Figure 5:
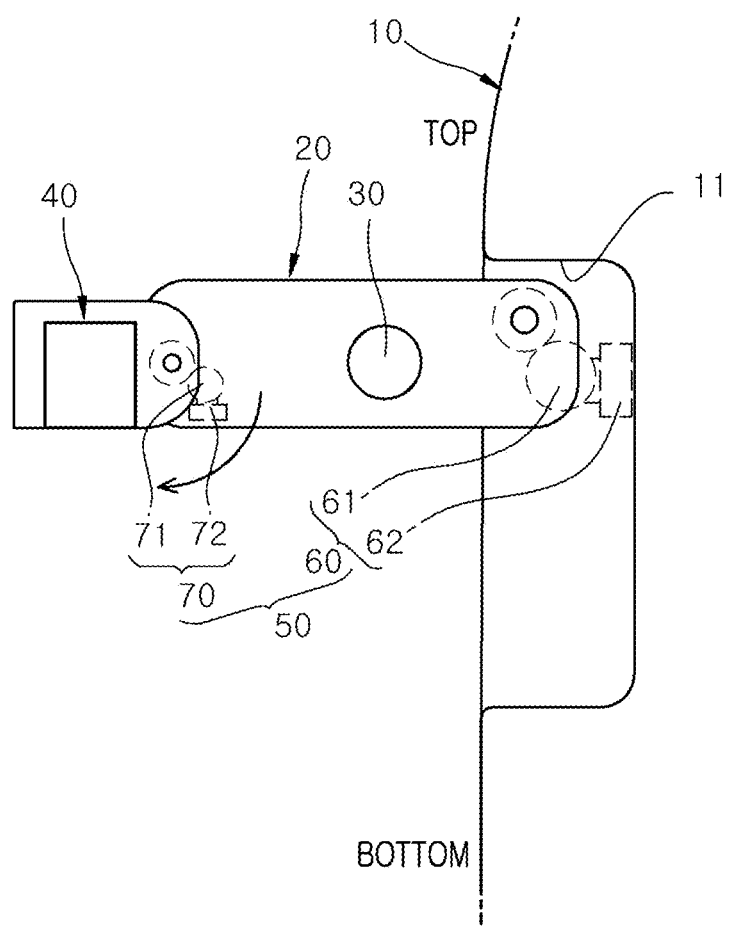
FIG. 5 illustrates that a second camera unit is rotated in a camera body in the side imaging device for a vehicle in accordance with the first embodiment of the present invention.

FIG. 1 illustrates a side imaging device for a vehicle in accordance with a first embodiment of the present invention, FIG. 2 is a block diagram illustrating the side imaging device for a vehicle in accordance with the first embodiment of the present invention, FIG. 3 illustrates a first driving unit of the side imaging device for a vehicle in accordance with the first embodiment of the present invention, FIG. 4 illustrates that a first camera unit is rotated in a housing groove in the side imaging device for a vehicle in accordance with the first embodiment of the present invention, and FIG. 5 illustrates that a second camera unit is rotated in a camera body in the side imaging device for a vehicle in accordance with the first embodiment of the present invention.

Referring to FIGS. 1 to 5, the side imaging device for a vehicle in accordance with the first embodiment of the present invention may include a camera body 20, a first camera unit 30, a second camera unit 40 and a driving unit 50.

The camera body 20 may be movably installed at both sides of a vehicle body 10. The camera body 20 may be formed in various shapes such as a cuboid shape and rectangular plate shape. When the camera body 20 is moved outward, the camera body 20 may protrude by a predetermined length or more from the vehicle body 10.

The vehicle body 10 may have a housing groove 11 formed therein, such that the camera body 20 is buried in the vehicle body 10. When the vehicle is not driven, the camera body 20 may be buried in the housing groove 11. Therefore, the side imaging device can be protected from external shock or the like. Furthermore, the first and second camera units 30 and 40 can be prevented from being contaminated by foreign matters such as dust, which makes it possible to secure a clean view.

The first camera unit 30 may be installed in the camera body 20, and serve to film the rear situation of the vehicle body 10. When the camera body 20 is moved out of the vehicle body 10, the first camera unit 30 may be disposed at a position spaced by a predetermined distance from the side surface of the vehicle body 10. The distance between the first camera unit 30 and the side surface of the vehicle body 10 may be properly changed in consideration of the full length of the vehicle. The first camera unit 30 may include a camera monitoring system (CMS).

The second camera unit 40 may be installed in the camera body 20, and serve to film an area around the side surface of the vehicle body 10. The area around the side surface of the vehicle body 10 may indicate a range in which the driver can check whether a pedestrian or object is present at either side of the vehicle.

When the camera body 20 is moved out of the vehicle body 10, the second camera unit 40 may be positioned further away from the side surface of the vehicle body 10 than the first camera unit 30. The second camera unit 40 may film an area in a predetermined range of the bottom and lateral sides of the vehicle body 10. The distance between the second camera unit 40 and the side surface of the vehicle body 10 may be properly changed in consideration of the full length of the vehicle. The second camera unit 40 may include an around view monitor (AVM) camera.

Since the first and second camera units 30 and 40 film the areas around the rear and lateral sides of the vehicle, the size of the side imaging device for a vehicle can be significantly reduced. Therefore, when the vehicle is driven, air resistance applied to the side imaging device for a vehicle can be reduced.

The driving unit 50 may be installed in the vehicle body 10 or the camera body 20, and move the camera body 20 to protrude from the vehicle body 10. Since the driving unit 50 moves the camera body 20 to protrude from the vehicle body 10, the first and second camera units 30 and 40 can film the rear situation and surrounding situation, with the camera body 20 protruding from the vehicle body 10.

The first and second camera units 30 and 40 may be connected to a control unit 81, and the control unit 81 may be connected to a display unit 83. The image signals taken by first and second camera units 30 and 40 may be transmitted to the control unit 81, and the control unit 81 may transmit the image signals to the display unit 83. The display unit 83 may display the images taken by the first and second camera units 30 and 40.

At this time, the display unit 83 may separately display the images taken by the first and second camera units 30 and 40. Furthermore, the display unit 83 may combine the images taken by the first and second camera units 30 and 40, and display one image.

The driving unit 50 may include first and second driving units 60 and 70. The first driving unit 60 may be installed in the vehicle body 10 or the camera body 20 so as to move the camera body 20 out of or into the vehicle body 10. The second driving unit 70 may be installed in the camera body 20 so as to move the second camera unit 40 in the camera body 20. After the camera body 20 is moved out of the vehicle body 10, the second driving unit 70 may move the second camera unit 40 in the camera body 20. Since the second camera unit 40 is folded and installed in the camera body 20, the housing groove 11 serving as the burial space of the side imaging device can be reduced in size.

The first driving unit 60 may rotate the camera body 20 to protrude from the vehicle body 10, and the second driving unit 70 may rotate the second camera unit 40 toward the outside of the camera body 20.

At this time, the first driving unit 60 may include a first gear unit 61 installed in the camera body 20 and a first gear motor 62 axially-coupled to the first gear unit 61 and installed in the vehicle body 10. The first gear unit 61 may include a plurality of gears engaged with each other. At this time, worm gears may be applied as the gears.

The camera body 20 may be rotated about a first hinge shaft (not illustrated), and one corner of the camera body 20 may be rounded so as not to be caught on the housing groove 11 when the camera body 20 is rotated.

The second driving unit 70 may include a second gear unit 71 installed in the second camera unit 40 and a second gear motor 72 axially-coupled to the second gear unit 71 and installed in the camera body 20. The second gear unit 71 may include a plurality of gears engaged with each other. The second camera unit 40 may be rotated about a second hinge shaft (not illustrated). The second driving unit 70 may be formed in the same shape as the first driving unit 60.

The first driving unit 60 may move the camera body 20 into or out of the housing groove 11 of the vehicle body 10, and the second driving unit 70 may fold or unfold the second camera unit 40 into or from the camera body 20. The first and second driving units 60 and 70 may be formed in various shapes, as long as the first and second driving units 60 and 70 can rotate the camera body 20 and the second camera unit 40.

The first driving unit 60 may rotate the camera body 20 in the top-to-bottom direction of the vehicle body 10, such that the camera body 20 protrudes from the vehicle body 10. Since the first driving unit 60 is rotated in the top-to-bottom direction of the vehicle body 10, the housing groove 11 may be elongated in the top-to-bottom direction of the vehicle body 10.

When the vehicle is started, the first and second driving units 60 and 70 may be sequentially driven. At this time, the first and second driving units 60 and 70 may be driven automatically or driven by a user's button manipulation. Therefore, after the camera body 20 is moved to the outside of the housing groove 11, the second camera unit 40 may be extended from the camera body 20.

When the vehicle is parked, the second and first driving units 70 and 60 may be sequentially driven. At this time, the second and first driving units 70 and 60 may also be driven automatically or driven by the user's button manipulation. Therefore, after the second camera unit 40 is folded into the camera body 20, the camera body 20 may be moved into the housing groove 11.

Next, a side imaging device for a vehicle in accordance with a second embodiment of the present invention will be described. Since the second embodiment is different from the first embodiment only in that the camera body and the second camera unit are moved in a different manner, the following descriptions will be focused on the features of the second embodiment.

Figure 6:
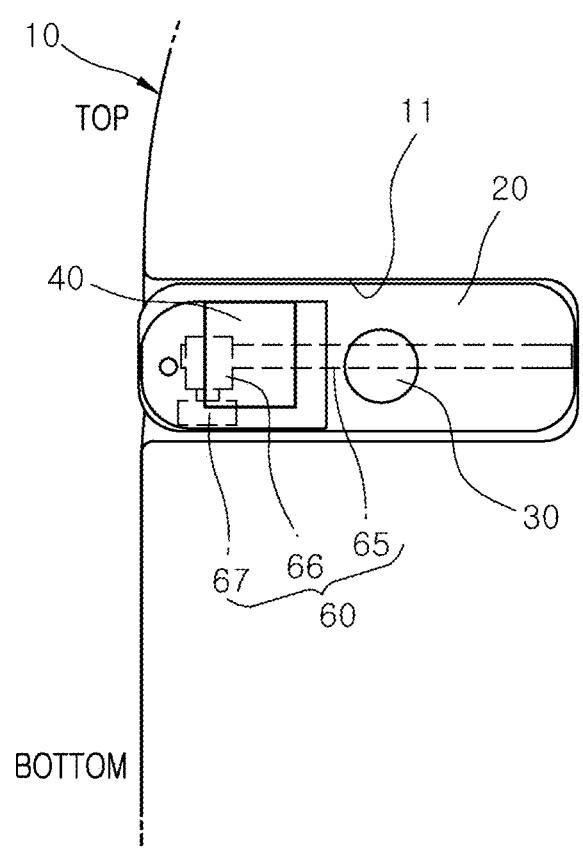
FIG. 6 illustrates a side imaging device for a vehicle in accordance with a second embodiment of the present invention.
Figure 7:
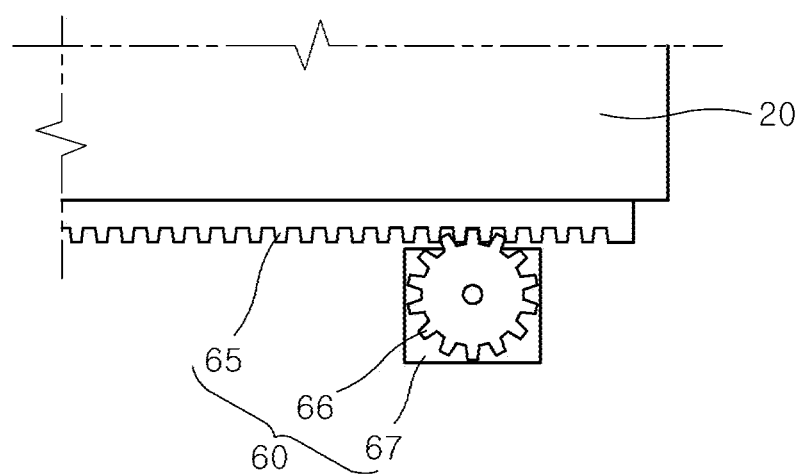
FIG. 7 illustrates a first driving unit of the side imaging device for a vehicle in accordance with the second embodiment of the present invention.
Figure 8:
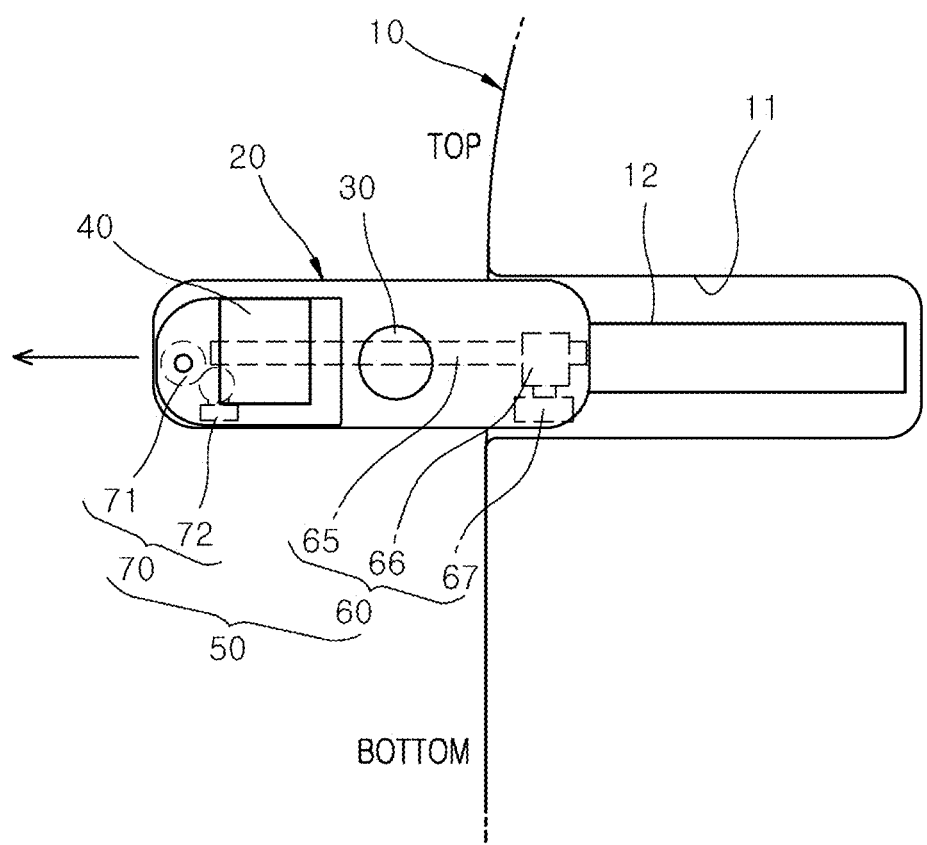
FIG. 8 illustrates that a first camera unit is linearly moved in the side imaging device for a vehicle in accordance with the second embodiment of the present invention.
Figure 9:
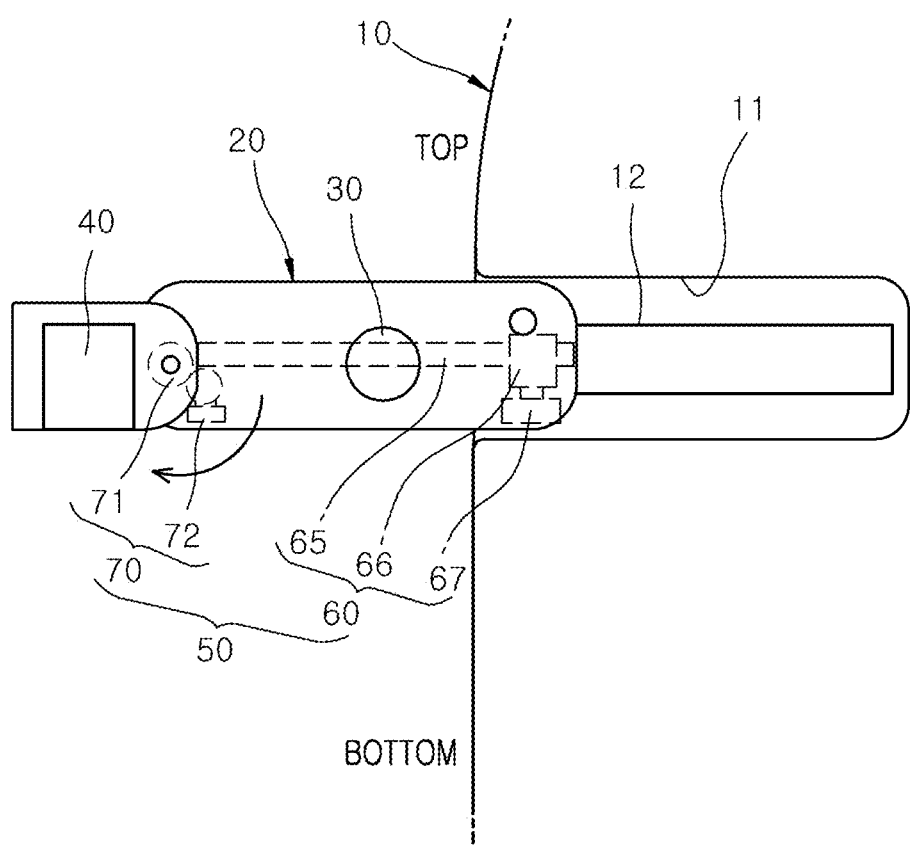
FIG. 9 illustrates that a second camera unit is rotated in a camera body in the side imaging device for a vehicle in accordance with the second embodiment of the present invention.

FIG. 6 illustrates a side imaging device for a vehicle in accordance with a second embodiment of the present invention, FIG. 7 illustrates a first driving unit of the side imaging device for a vehicle in accordance with the second embodiment of the present invention, FIG. 8 illustrates that a first camera unit is linearly moved in the side imaging device for a vehicle in accordance with the second embodiment of the present invention, and FIG. 9 illustrates that a second camera unit is rotated in a camera body in the side imaging device for a vehicle in accordance with the second embodiment of the present invention.

Referring to FIGS. 6 to 9, the first driving unit 60 may linearly move the camera body 20 to protrude from the vehicle body 10, and the second driving unit 70 may rotate the second camera unit 40 toward the outside of the camera body 20. Since the first driving unit 60 linearly moves the camera body 20 in the widthwise direction of the vehicle body 10, the housing groove 11 in which the camera body 20 is buried may be formed in a relatively small size.

The first driving unit 60 may include a first rack gear 65 installed on the camera body 20, a first pinion gear 66 engaged with the first rack gear 65, and a first pinion motor 67 axially-coupled to the first pinion gear 66. When the first pinion motor 67 is driven, the first pinion gear 66 and the first rack gear 65 engaged with each other may be rotated together. Therefore, the camera body 20 may be moved into or out of the housing groove 11. The housing groove 11 may have a guide part (not illustrated) to guide the camera body 20 to linearly move. The first driving unit 60 may be operated through various methods such as a belt method, link method and ball screw method, as long as the first driving unit 60 can linearly move the camera body 20.

The second driving unit 70 may include a second gear unit 71 installed in the second camera unit 40 and a second gear motor 72 axially-coupled to the second gear unit 71 and installed in the camera body 20.

The second gear unit 71 may include a plurality of gears engaged with each other. The second camera unit 40 may be rotated about a second hinge shaft (not illustrated).

When the vehicle is started, the first and second driving units 60 and 70 may be sequentially driven. At this time, the first and second driving units 60 and 70 may be driven automatically or driven by a user's button manipulation. Therefore, after the camera body 20 is linearly moved to the outside of the housing groove 11, the second camera unit 40 may be rotated and extended from the camera body 20.

When the vehicle is parked, the second and first driving units 70 and 60 may be sequentially driven. At this time, the second and first driving units 70 and 60 may also be driven automatically or driven by the user's button manipulation. Therefore, after the second camera unit 40 is folded into the camera body 20, the camera body 20 may be linearly moved into the housing groove 11.

Next, a side imaging device for a vehicle in accordance with a third embodiment of the present invention will be described. Since the third embodiment is different from the first embodiment only in that the camera body and the second camera unit are moved in a different manner, the following descriptions will be focused on the features of the third embodiment.

Figure 10A:
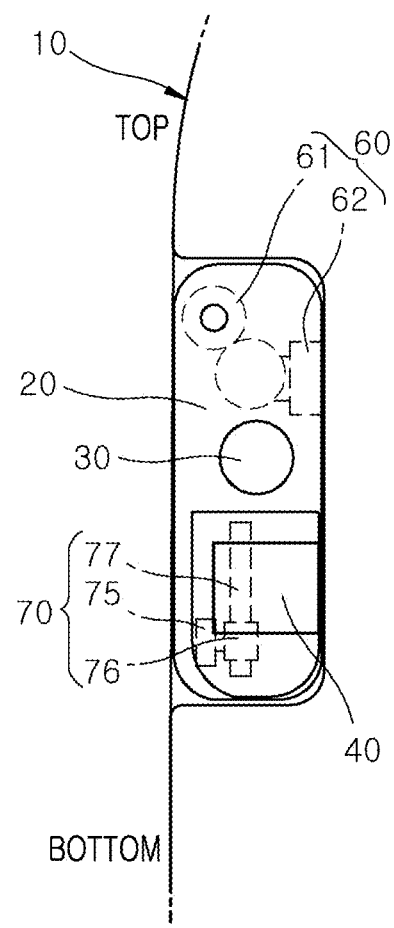
FIGS. 10A to 10C illustrate a side imaging device for a vehicle in accordance with a third embodiment of the present invention.
Figure 10B:
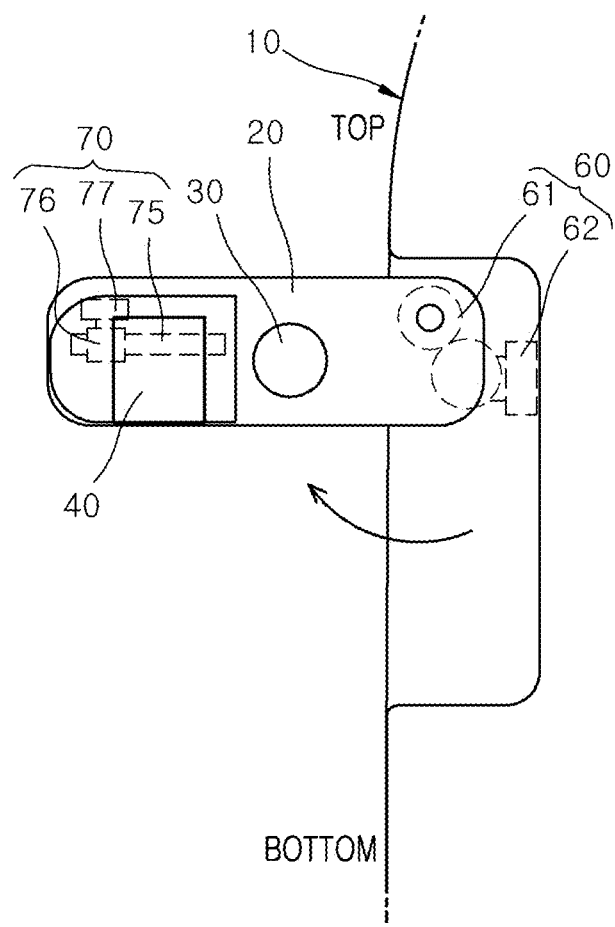
Figure 10C:
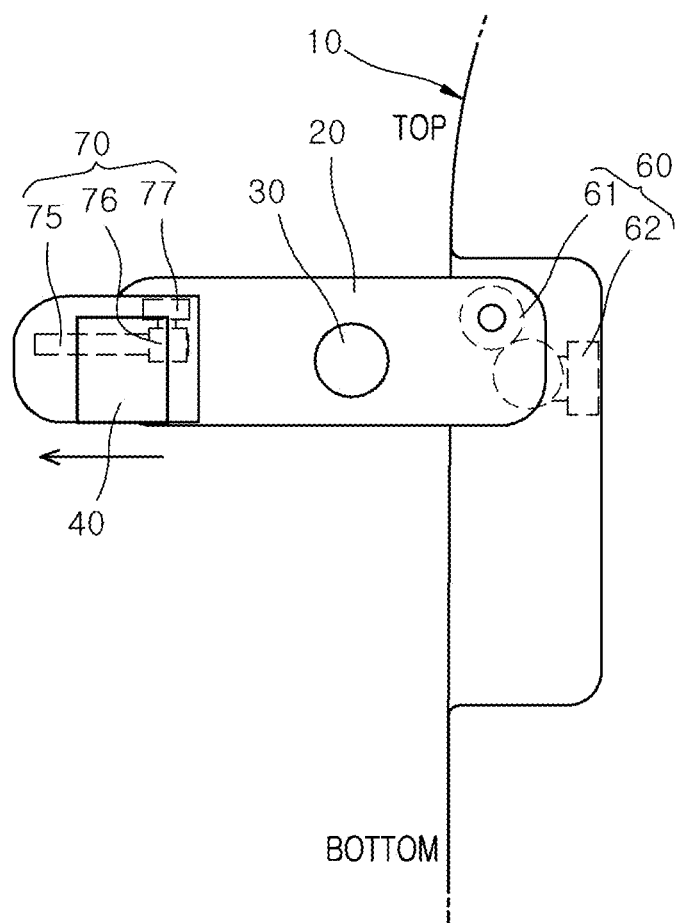

FIGS. 10A to 10C illustrate the side imaging device for a vehicle in accordance with the third embodiment of the present invention.

Referring to FIGS. 10A to 10C, the first driving unit 60 may rotate the camera body 20 to protrude from the vehicle body 10, and the second driving unit 70 may linearly move the second camera unit 40 to the outside of the camera body 20.

The first driving unit 60 may include a first gear unit 61 installed in the camera body 20 and a first gear motor 62 axially-coupled to the first gear unit 61 and installed in the vehicle body 10. The first gear unit 61 may include a plurality of gears engaged with each other.

The second driving unit 70 may include a second rack gear 75 installed on the camera body 20, a second pinion gear 76 engaged with the second rack gear 75, and a second pinion motor 77 axially-coupled to the second pinion gear 76. When the second pinion motor 77 is driven, the second pinion gear 76 and the second rack gear 75 engaged with each other may be rotated together. Therefore, the camera body 20 may be moved into or out of the housing groove 11. The housing groove 11 may have a guide part to guide the camera body 20 to linearly move. The second driving unit 70 may be formed in the same shape as the first driving unit 60 in accordance with the second embodiment. The second driving unit 70 may be operated through various methods such as a belt method, link method and ball screw method, as long as the second driving unit 70 can linearly move the camera body 20.

Next, a side imaging device for a vehicle in accordance with a fourth embodiment of the present invention will be described. Since the fourth embodiment is different from the first embodiment only in that the camera body and the second camera unit are moved in a different manner, the following descriptions will be focused on the features of the fourth embodiment.

Figure 11A:
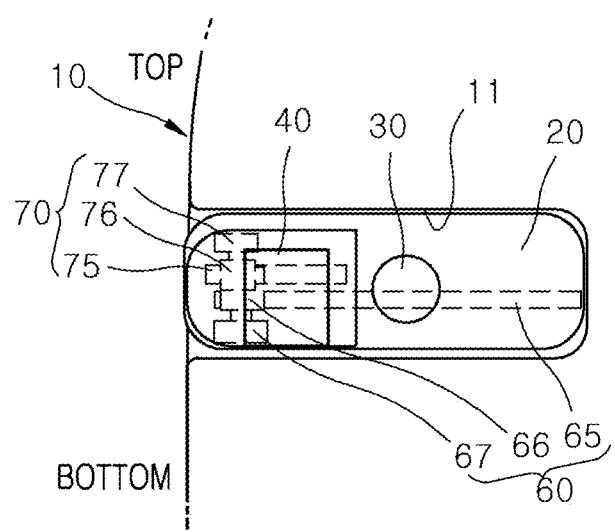
FIGS. 11A to 11C illustrate a side imaging device for a vehicle in accordance with a fourth embodiment of the present invention.
Figure 11B:
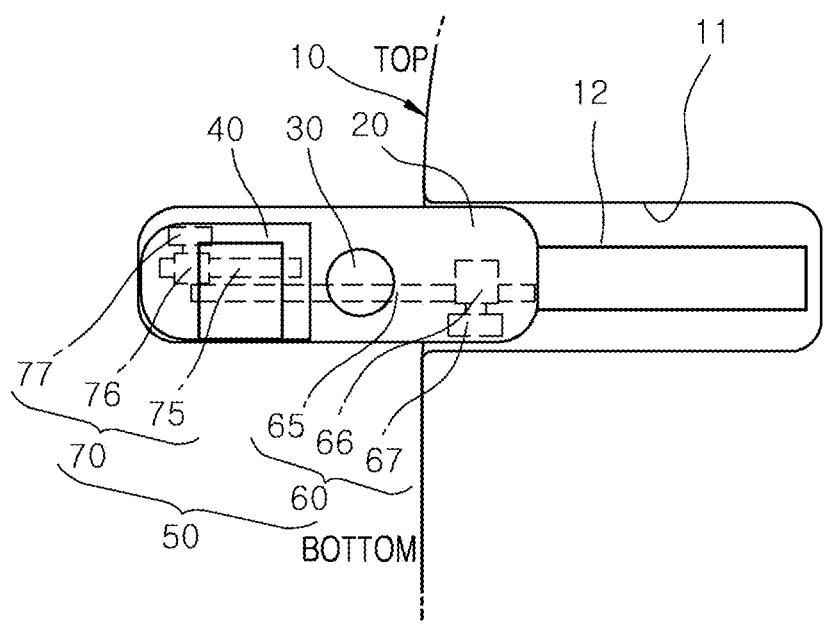
Figure 11C:
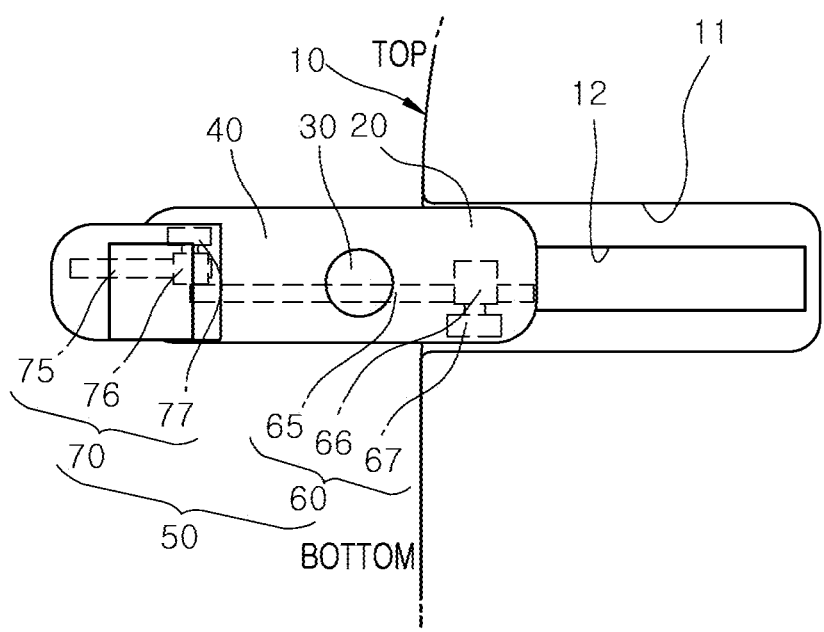

FIGS. 11A to 11C illustrate the side imaging device for a vehicle in accordance with the fourth embodiment of the present invention.

Referring to FIGS. 11A to 11C, the first driving unit 60 may linearly move the camera body 20 to protrude from the vehicle body 10, and the second driving unit 70 may linearly move the second camera unit 40 to the outside of the camera body 20.

The first driving unit 60 may include a first rack gear 65 installed in the camera body 20, a first pinion gear 66 engaged with the first rack gear 65, and a first pinion motor 67 axially-coupled to the first pinion gear 66. When the first pinion motor 67 is driven, the first pinion gear 66 and the first rack gear 65 engaged with each other may be rotated together. Therefore, the camera body 20 may be moved into or out of the housing groove 11. The housing groove 11 may have a guide part to guide the camera body 20 to linearly move. The first driving unit 60 may be operated through various methods such as a belt method, link method and ball screw method, as long as the first driving unit 60 can linearly move the camera body 20.

The second driving unit 70 may include a second rack gear 75 installed in the camera body 20, a second pinion gear 76 engaged with the second rack gear 75, and a second pinion motor 77 axially-coupled to the second pinion gear 76. When the second pinion motor 77 is driven, the second pinion gear 76 and the second rack gear 75 engaged with each other may be rotated together. Therefore, the camera body 20 may be moved into or out of the housing groove 11. The housing groove 11 may have a guide part to guide the camera body 20 to linearly move. The second driving unit 70 may be operated through various methods such as a belt method, link method and ball screw method, as long as the second driving unit 70 can linearly move the camera body 20.

Next, a side imaging device for a vehicle in accordance with a fifth embodiment of the present invention will be described. Since the fifth embodiment is different from the first embodiment only in that the camera body is moved in a different manner, the following descriptions will be focused on the features of the fifth embodiment.

Figure 12A:
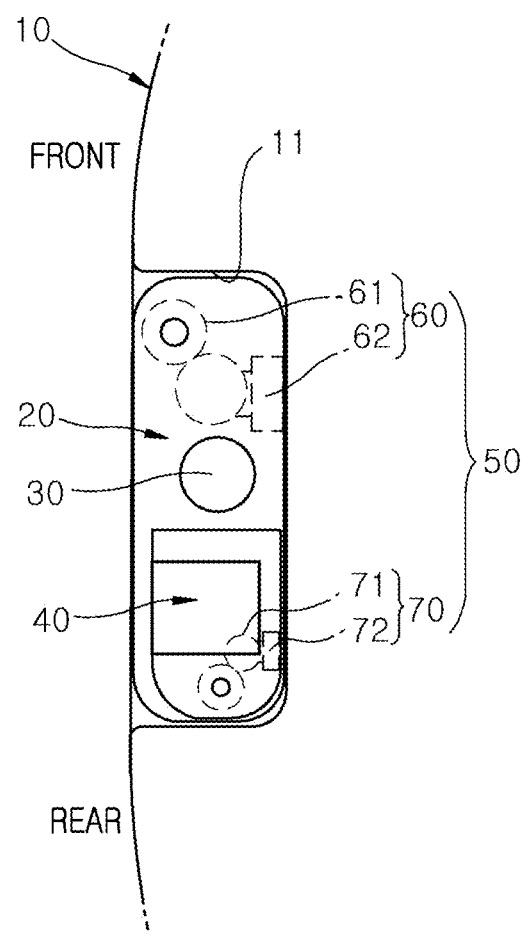
FIGS. 12A to 12C illustrate a side imaging device for a vehicle in accordance with a fifth embodiment of the present invention.
Figure 12B:
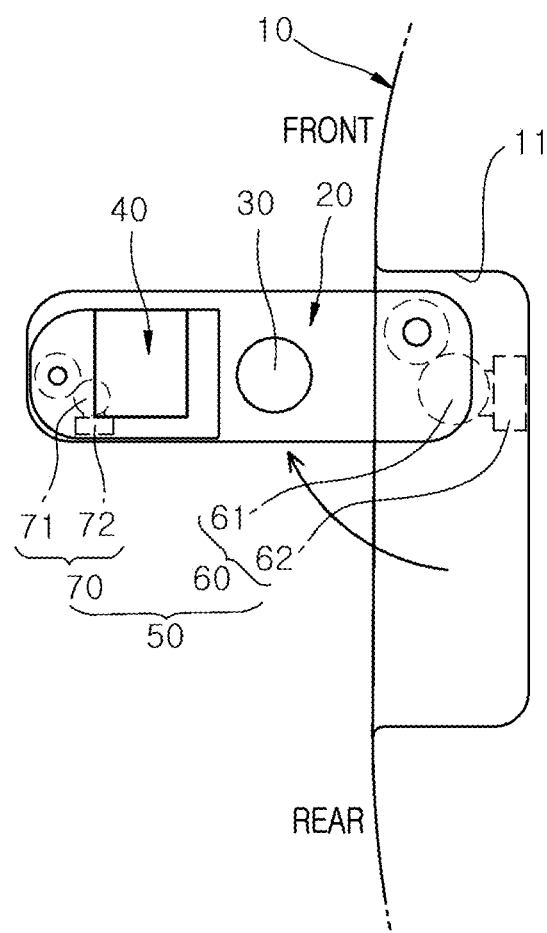
Figure 12C:
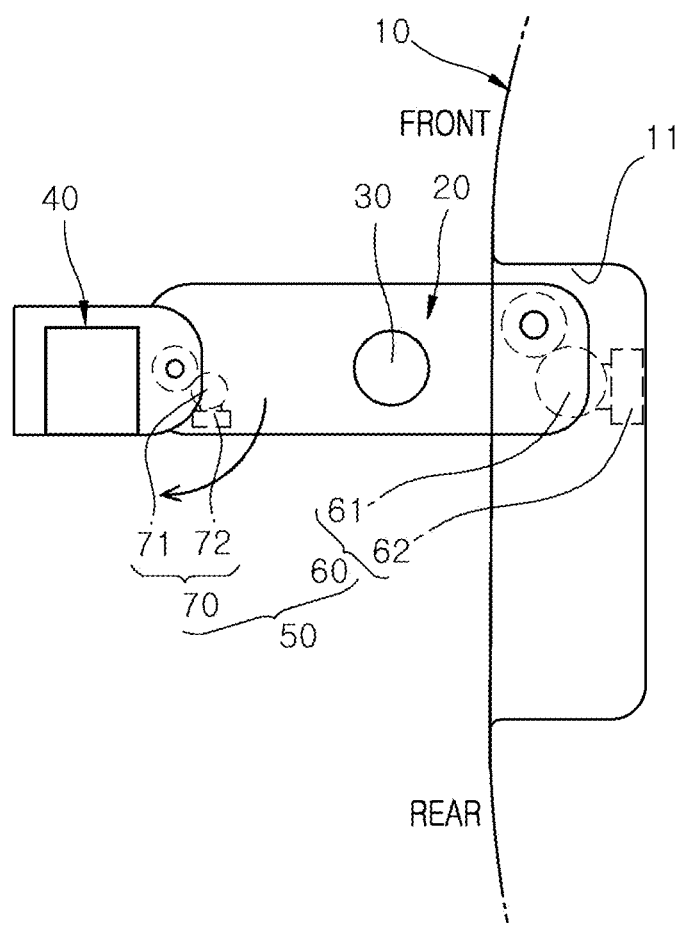

FIGS. 12A to 12C illustrate the side imaging device for a vehicle in accordance with the fifth embodiment of the present invention.

Referring to FIGS. 12A to 12C, the first driving unit 60 may rotate the camera body 20 in the front-to-rear direction of the vehicle body 10, such that the camera body 20 protrudes from the vehicle body 10. Since the first driving unit 60 is rotated in the front-to-rear direction of the vehicle body 10, the housing groove 11 may be elongated in the front-to-rear direction of the vehicle body 10.

The second driving unit 70 may be rotatably installed or movably installed in the camera body 20.

Next, a side imaging device for a vehicle in accordance with a sixth embodiment of the present invention will be described. Since the sixth embodiment is different from the first embodiment only in that the housing groove is opened/closed in a different manner when the camera body is moved out of the housing groove, the following descriptions will be focused on the features of the sixth embodiment.

Figure 13A:
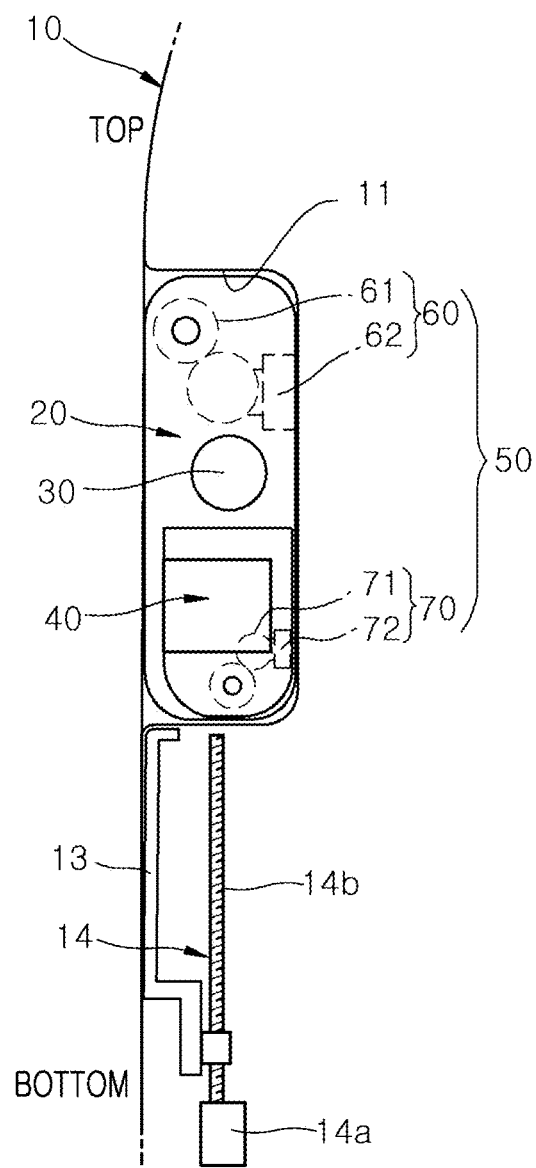
FIGS. 13A and 13B illustrate a side imaging device for a vehicle in accordance with a sixth embodiment of the present invention.
Figure 13B:
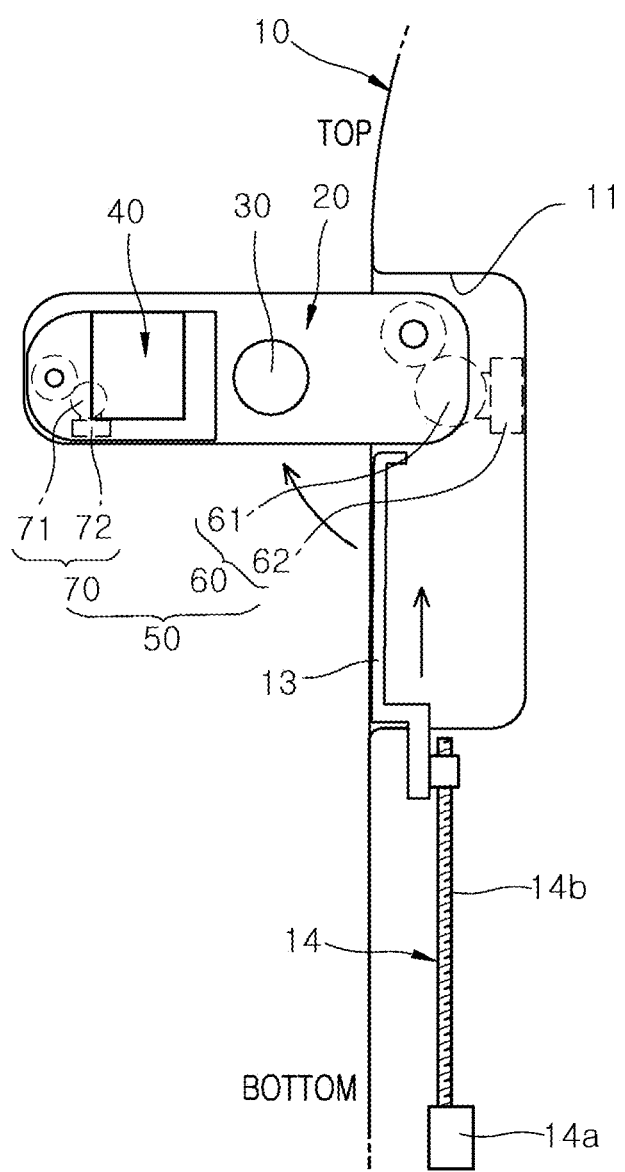

FIGS. 13A to 13C illustrate the side imaging device for a vehicle in accordance with the sixth embodiment of the present invention.

Referring to FIGS. 13A to 13B, the side imaging device for a vehicle may further include a moving cover 13 and a cover driving unit 14.

The moving cover 13 may be installed in the vehicle body 10 so as to close the housing groove 11 when the camera body 20 is moved out of the housing groove 11. The housing groove 11 may have a guide hole (not illustrated) formed at the sidewall thereof, such that the moving cover 13 is passed through the guide hole. The moving cover 13 may be brought in contact with the camera body 20 and shield the housing groove 11 from outside, when the camera body 20 is moved out of the housing groove 11. Therefore, when the camera body 20 is moved out of the housing groove 11, the moving cover 13 can prevent foreign matters from flowing into the housing groove 11.

The cover driving unit 14 may be installed in the vehicle body 10, and drive the moving cover 13 to open/close the housing groove 11. The cover driving unit 14 may include a motor 14a and a ball screw 14b. The cover driving unit 14 may include an elastic member which applies an elastic force to push the moving cover 13.

Next, a side imaging device for a vehicle in accordance with a seventh embodiment of the present invention will be described. Since the seventh embodiment is different from the first embodiment only in that the housing groove is opened/closed in a different manner when the camera body is moved out of the housing groove, the following descriptions will be focused on the features of the seventh embodiment.

Figure 14A:
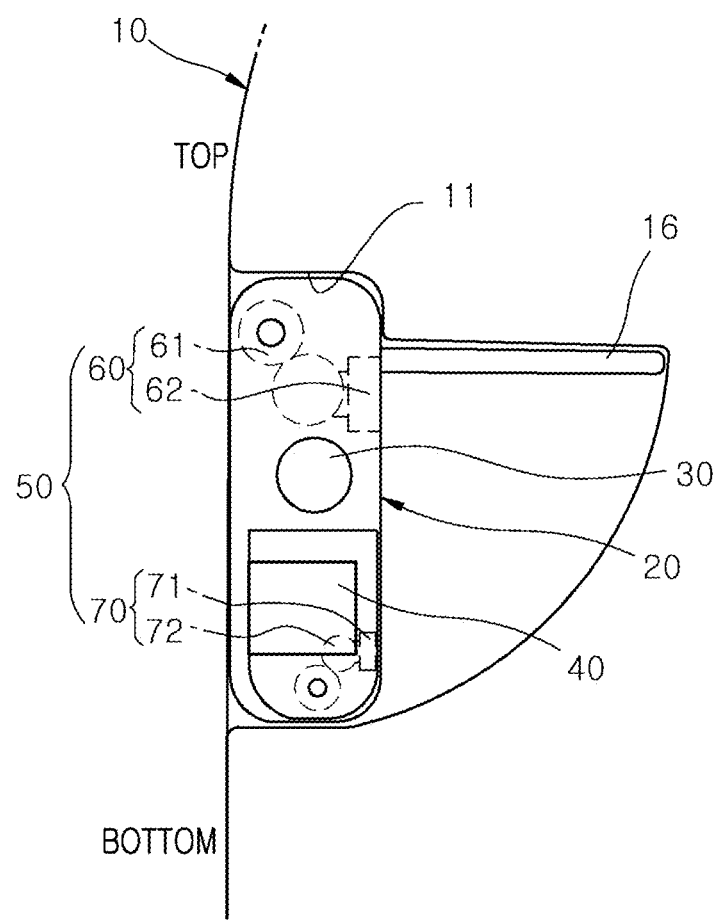
FIGS. 14A and 14B illustrate a side imaging device for a vehicle in accordance with a seventh embodiment of the present invention.
Figure 14B:
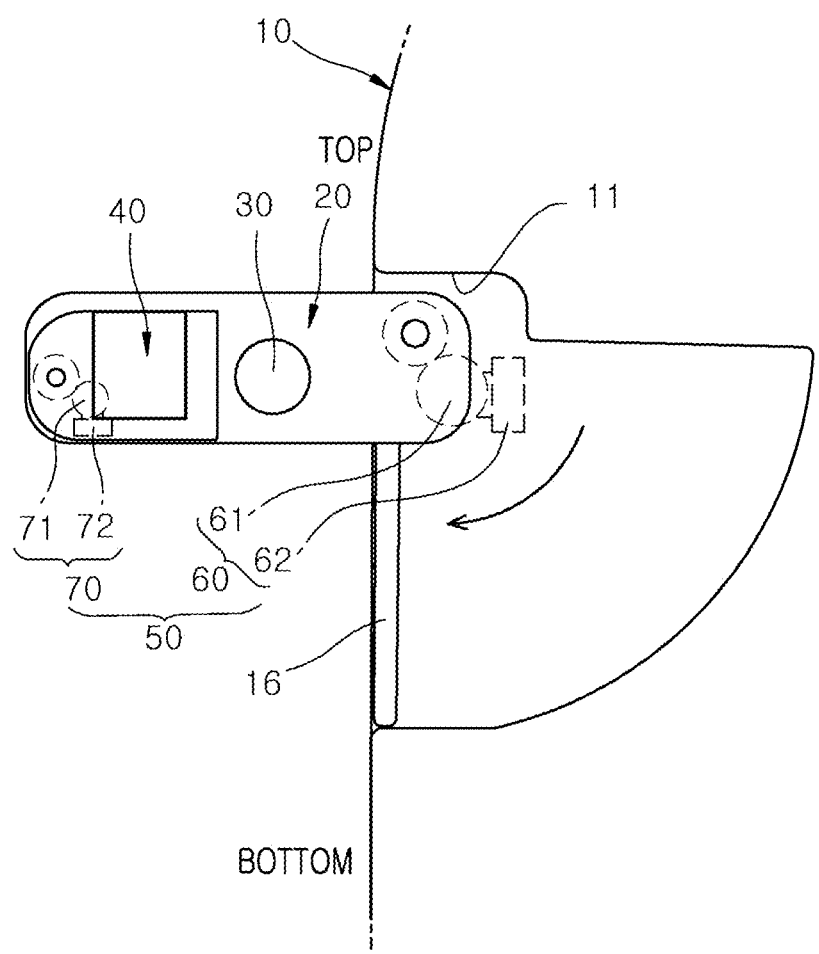

FIGS. 14A and 14B illustrate the side imaging device for a vehicle in accordance with the seventh embodiment of the present invention.

Referring to FIGS. 14A and 14B, an extension cover 16 may be extended from the camera body 20, and close the housing groove 11 when the camera body 20 is moved out of the housing groove 11. The extension cover 16 may be manufactured separately from the camera body 20 and fixed to the camera body 20 through a fastening member or adhesive, or integrated with the camera body 20. The extension cover 16 may be formed perpendicular to the camera body 20.

Therefore, when the camera body 20 is moved out of the housing groove 11, the extension cover 16 can prevent foreign matters from flowing into the housing groove 11. Furthermore, since the extension cover 16 is rotated with the camera body 20, a separate driving device does not need to be installed in order to move the extension cover 16.

Next, a side imaging device for a vehicle in accordance with an eighth embodiment of the present invention will be described. Since the eighth embodiment is different from the first embodiment only in that a mirror is formed in the camera body, the following descriptions will be focused on the features of the eighth embodiment.

Figure 15A:
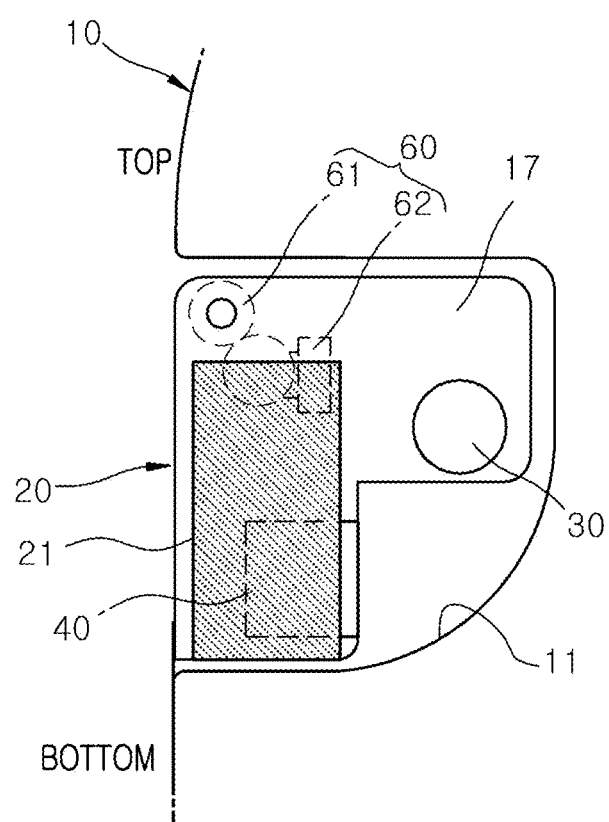
FIGS. 15A and 15B illustrate a side imaging device for a vehicle in accordance with an eighth embodiment of the present invention.
Figure 15B:
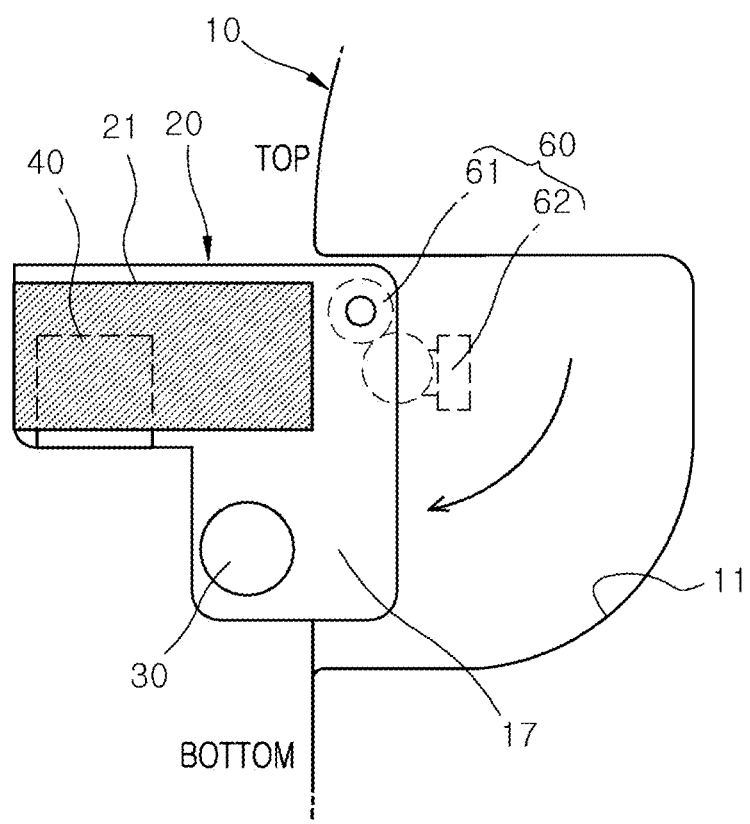

FIGS. 15A and 15B illustrate the side imaging device for a vehicle in accordance with the eighth embodiment of the present invention.

Referring to FIGS. 15A to 15B, the side imaging device for a vehicle may further include a mirror 21 which is disposed on the camera body 20 so as to reflect the rear side of the vehicle body 10 The mirror 21 may have a smaller size than the existing side mirror.

The mirror 21 may be adhered to the rear surface of the camera body 20 through an adhesive or the like. The mirror 21 may be installed in a region of the rear surface of the camera body 20, excluding the first camera unit 30. The camera body 20 may have an extension part 17 which is extended to the outside in order to expand the region in which the mirror 21 is installed. The first camera unit 30 may be installed in the extension part 17.

Since the mirror 21 is installed on the camera body 20, a driver can check the rear situation of the vehicle with the mirror 21 while driving the vehicle, even when the first camera unit 30 broke down or a problem occurred in the first camera unit 30. Furthermore, even when the first camera unit 30 is normally operated, the driver can subsidiarily determine the rear situation of the vehicle through the mirror 21.

In accordance with the present embodiments, since the driving unit moves the camera body to protrude from the vehicle body, the first and second camera units may film the rear and both sides of the vehicle, while protruding from the vehicle body.

Furthermore, since the first and second camera units film the rear and both sides of the vehicle, the size of the side imaging device for a vehicle can be significantly reduced. Therefore, when the vehicle is driven, air resistance applied to the side imaging device can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A side imaging device for a vehicle, comprising:
   a camera body movably installed at a side of a vehicle body;
   a first camera unit installed in the camera body, and configured to film a rear side of the vehicle body;
   a second camera unit installed in the camera body, and configured to film an area around a side surface of the vehicle body;
   a first driving unit installed in the vehicle body or the camera body and configured to move the camera body out of or into the vehicle body; and
   a second driving unit installed in the camera body and configured to move the second camera unit in the camera body.

2. The side imaging device of claim 1, wherein the first driving unit rotates the camera body to protrude from the vehicle body, and
   the second driving unit rotates the second camera unit to outside of the camera body.

3. The side imaging device of claim 1, wherein the first driving unit linearly moves the camera body to protrude from the vehicle body, and
   the second driving unit rotates the second camera unit to outside of the camera body.

4. The side imaging device of claim 1, wherein the first driving unit rotates the camera body to protrude from the vehicle body, and
   the second driving unit linearly moves the second camera unit to outside of the camera body.

5. The side imaging device of claim 1, wherein the first driving unit linearly moves the camera body to protrude from the vehicle body, and
   the second driving unit linearly moves the second camera unit to outside of the camera body.

6. The side imaging device of claim 1, wherein the first driving unit rotates the camera body in a top-to-bottom direction of the vehicle body such that the camera body protrudes from the vehicle body.

7. The side imaging device of claim 1, wherein the first driving unit rotates the camera body in a front-to-rear direction of the vehicle body such that the camera body protrudes from the vehicle body.

8. The side imaging device of claim 1, wherein the vehicle body has a housing groove formed therein, such that the camera body is buried in the vehicle body.

9. The side imaging device of claim 8, further comprising:
   a moving cover installed in the vehicle body so as to close the housing groove when the camera body is moved out of the housing groove; and
   a cover driving unit installed in the vehicle body and configured to drive the moving cover to close the housing groove.

10. The side imaging device of claim 8, wherein the camera body has an extension cover extended from the camera body, the extension cover serving to close the housing groove when the camera body is moved out of the housing groove.

11. The side imaging device of claim 1, further comprising a mirror arranged on the camera body so as to reflect the rear side of the vehicle body.

* * * * *